(No Model.)
A. HOGG.
FRUIT PICKER.
No. 488,243. Patented Dec. 20, 1892.
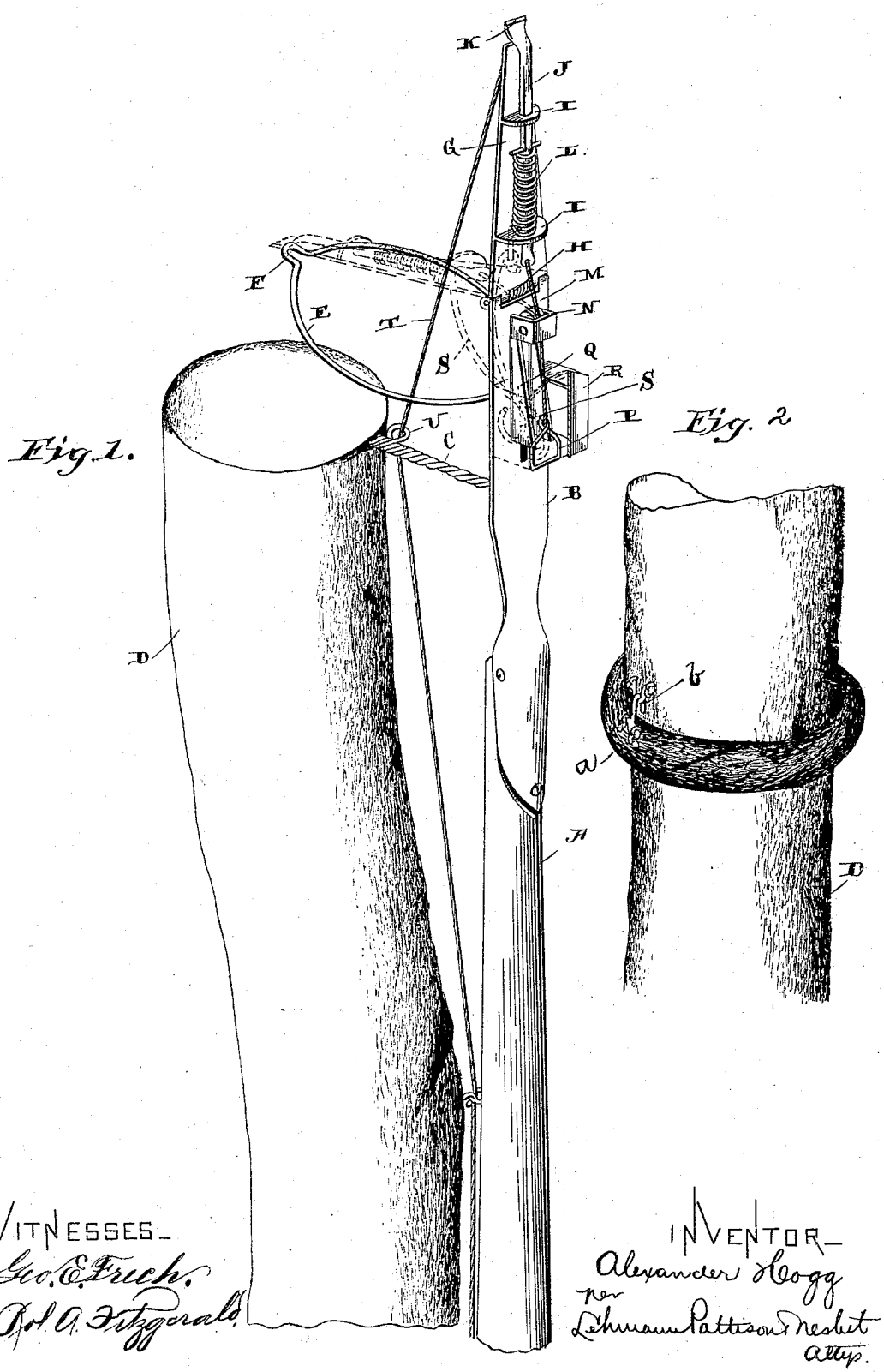

2
UNITED STATES PATENT OFFICE.

ALEXANDER HOGG, OF AKRON, OHIO.

FRUIT-PICKER.

SPECIFICATION forming part of Letters Patent No. 488,243, dated December 20, 1892.

Application filed July 27, 1892. Serial No. 441,355. (No model.)

*To all whom it may concern:*

Be it known that I, ALEXANDER HOGG, of Akron, in the county of Summit and State of Ohio, have invented certain new and useful Improvements in Fruit-Pickers; and I do hereby declare the following to be a full, clear, and exact description of the invention, such as will enable others skilled in the art to which it pertains to make and use it, reference being had to the accompanying drawings, which form part of this specification.

My invention relates to improvements in fruit pickers; and it consists in the construction and arrangement of parts which will be fully described hereinafter and particularly referred to in the claims.

The object of my invention is to produce a fruit picker which is mounted upon the end of a long handle, carrying a bag to convey the fruit to the ground, or to hold the same, the picker being constructed with a spring actuated knife for cutting the stem of the fruit, the latter adapted to be automatically set and released, by pulling a cord.

Figure 1, is a perspective view of a fruit picker which embodies my invention, the lower end of the bar being broken off. Fig. 2, is a perspective view of the lower end of the bag, showing a soft ring for breaking the fall of the fruit.

A indicates a handle which is sufficiently long to reach to the tops of trees, and extending inward from a plate B which is attached to the upper end of the handle is an arm C. This arm C is preferably made of wire, and carries a ring at its outer end to which is secured the upper end of a bag D, that receives the fruit after it is picked. Extending from this plate above the said ring, is another ring E, which has its outer edge about over the center of the upper end of the bag, and provided with a bend F. This bend is intended to receive the stem of the fruit, after it is passed through the ring.

Pivoted to the upper end of the plate B, above both rings, is a plate or arm G, which arm is normally held in an upright position as shown in solid lines in the drawings, by means of a spring H, which passes around the pivotal pin of the said plate. Projecting laterally from the outer side of this pivoted or hinged plate are two ears or projections I, which receive a spring actuated rod J, which rod carries a knife edge K, at its outer end. Placed around the rod is a spring L, which keeps the said rod normally pressed outward, with the said knife edge over the outer end of the plate. Connected to the inner end of this rod is a cord or wire M, which passes over a pulley N supported at the outer side of the plate B, and attached to the opposite end of this cord is a stirrup or ring P. When the plate G is in a vertical position, the stirrup or ring drops and passes over the lower ends of the shoulders of stops Q, which project from the plate B, as shown. The shoulders and the stirrup are preferably inclosed within the housing R, which holds the ring to its proper position to be caught by the shoulders when it drops. A tripping rod or lever S, has its upper end connected to the inner side of the pivoted plate G, and its lower end passing through openings made in the plate B, and curved around as shown.

Attached to the pivoted plate at its inner side is an operating cord T, which passes through a guide U.

The operation of my invention is as follows:—The fruit to be gathered is passed through the upper ring and its stem placed in the bend thereof. A downward pull upon the cord T, will pull the pivoted plate down with its lower end resting over the bend in the upper ring as shown in dotted lines. The stirrup being caught by the shoulders or stops Q, the cord attached to the spring actuated knife edge rod is held, so that while the pivoted plate is being drawn down the spring actuated rod is being drawn inward against the tension of the spring surrounding it. When the pivoted plate has reached the proper point to cut the stem of the fruit, the lever S, has moved outward at its lower end sufficiently to force the stirrup off the stops Q, thus releasing the spring actuated rod and allowing it to be thrown by the spring, the knife edge striking the stem of the fruit and cutting it, and the fruit dropping into the bag. When the cord T is released the plate B again rises and the stirrup is again caught ready to be tripped when the plate is again operated. If desired the lower end of the cord T can be attached to the lever pivoted to the handle A as will be understood.

For the purpose of breaking the fall of the fruit through the bag before it reaches the ground or a basket placed to catch it, a soft ring $a$, is placed around the bag at a convenient place to be held in an inclined position by the hand, so that the fruit will be stopped in its descent sufficiently to prevent injury thereof. The ring is attached to the bag by a hook or hooks $b$, as clearly illustrated in Fig. 2.

From the above description it will be seen that the fruit is cut from the tree automatically and dropped into the bag. The upper ring is merely a guide to hold the stem of the fruit in position to be cut by the knife edge of the rod when the pivoted plate is drawn down.

The picker is especially adapted for picking apples, oranges, pears, and other similar fruit.

Having thus described my invention, what I claim and desire to secure by Letters Patent is:—

1. A fruit gatherer, comprising a handle, a guiding ring, a pivoted plate above the guiding ring, a spring actuated knife, a setting cord attached thereto, and a tripping means operated by the said pivoted plate, substantially as specified.

2. A fruit gatherer comprising a handle, a guide ring, a plate pivoted above the said ring, a spring actuated knife rod upon the said pivoted plate, a cord attached to the inner end of the rod carrying a ring or stirrup at its opposite end, stops for the ring, and a tripping lever operated by the said pivoted plate, substantially as described.

3. A fruit gatherer comprising a guiding ring, a plate pivotally supported above the said guiding ring, a spring actuated rod upon the plate, having its outer end provided with a knife edge, a cord attached to the opposite end carrying a ring or stirrup, stops for the ring, and a lever having its upper end connected to the pivoted plate and its lower end engaging the ring for throwing it off the stops, substantially as set forth.

4. A fruit gatherer comprising a handle a ring carrying a bag, a guiding ring above the bag having its outer periphery over the center of the bag and provided with a bend for the stem of the fruit, a pivoted plate carrying a spring actuated knife, a means for setting the knife, and a means operated by the said pivoted plate for tripping the knife, substantially as specified.

In testimony whereof I affix my signature in presence of two witnesses.

ALEXANDER HOGG.

Witnesses:
JAMES DERRIG,
ANDREW J. WILHELM.